United States Patent
Jarrossay et al.

(10) Patent No.: US 11,506,085 B2
(45) Date of Patent: Nov. 22, 2022

(54) TURBINE SHROUD SECTOR WITH COOLED SEALING STRIPS

(71) Applicant: SAFRAN AIRCRAFT ENGINES, Paris (FR)

(72) Inventors: Clement Jarrossay, Moissy-Cramayel (FR); Sebastien Serge Francis Congratel, Moissy-Cramayel (FR); Antoine Claude Michel Etienne Danis, Moissy-Cramayel (FR); Clement Jean Pierre Duffau, Moissy-Cramayel (FR); Nicolas Paul Tableau, Moissy-Cramayel (FR); Lucien Henri Jacques Quennehen, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/287,070

(22) PCT Filed: Oct. 21, 2019

(86) PCT No.: PCT/FR2019/052491
§ 371 (c)(1),
(2) Date: Apr. 20, 2021

(87) PCT Pub. No.: WO2020/089540
PCT Pub. Date: May 7, 2020

(65) Prior Publication Data
US 2021/0355844 A1 Nov. 18, 2021

(30) Foreign Application Priority Data
Oct. 29, 2018 (FR) ...................................... 1859983

(51) Int. Cl.
*F01D 11/08* (2006.01)
*F01D 25/24* (2006.01)
(Continued)

(52) U.S. Cl.
CPC ............. *F01D 25/246* (2013.01); *F01D 9/04* (2013.01); *F01D 11/005* (2013.01); *F01D 11/08* (2013.01);
(Continued)

(58) Field of Classification Search
CPC ...... F01D 511/005; F01D 511/08; F01D 9/04; F01D 11/005; F01D 11/08; F01D 25/24;
(Continued)

(56) References Cited

U.S. PATENT DOCUMENTS

| 2012/0141257 A1* | 6/2012 | Berche ................. F01D 11/005 415/177 |
| 2018/0355755 A1* | 12/2018 | Groves, II ............ F01D 11/005 |
| 2019/0040758 A1* | 2/2019 | Quennehen ............. F01D 11/08 |

FOREIGN PATENT DOCUMENTS

| EP | 1593813 A1 | 11/2005 |
| FR | 2919345 A1 | 1/2009 |

(Continued)

OTHER PUBLICATIONS

International Search Report received for PCT Patent Application No. PCT/FR2019/052491, dated Jan. 24, 2020, 5 pages (2 pages of English Translation and 3 pages of Original Document).

*Primary Examiner* — Christopher Verdier
*Assistant Examiner* — Maxime M Adjagbe
(74) *Attorney, Agent, or Firm* — Womble Bond Dickinson (US) LLP

(57) ABSTRACT

A turbine shroud sector made of ceramic matrix composite, of longitudinal axis X and which includes a base with a radially internal face, a radially external face from which
(Continued)

there extend upstream and downstream tabs for attachment to a shroud support structure. The base includes a first slot and a second slot, which is arranged radially on the outside of the first slot. The slots are formed in the lateral face. A first and a second sealing strip rest against a radially internal wall of the first and second slots. The first strip has the overall shape of an omega and the shroud sector exhibits a first clearance which is defined radially between a central part of the first strip and the radially internal wall of the first slot, and a second clearance which is defined radially between this central part and a radially external wall of the first slot.

15 Claims, 2 Drawing Sheets

(51) Int. Cl.
*F01D 9/04* (2006.01)
*F01D 11/00* (2006.01)

(52) U.S. Cl.
CPC ...... *F05D 2240/11* (2013.01); *F05D 2250/75* (2013.01); *F05D 2300/6033* (2013.01)

(58) Field of Classification Search
CPC ............... F01D 25/246; F05D 2240/11; F05D 2300/6033; F05D 2250/75
USPC ......................................... 415/135, 138, 139
See application file for complete search history.

(56) References Cited

FOREIGN PATENT DOCUMENTS

| | | | |
|---|---|---|---|
| FR | 3041993 A1 | 4/2017 | |
| GB | 2486954 A | 7/2012 | |

* cited by examiner

TURBINE SHROUD SECTOR WITH COOLED SEALING STRIPS

1. FIELD OF THE INVENTION

The present invention relates to the field of turbomachines and in particular to aircraft turbomachines. It relates, in particular, to a shroud sector made of a ceramic matrix composite of a turbomachine component, such as a turbine, equipped with cooling means.

2. BACKGROUND

The prior art comprises the patent documents FR-A1-3041993, FR-A1-2919345, EP-A1-1593813 and GB-A-2486954.

A turbomachine turbine of longitudinal axis X comprises one or more stages each comprising a stator and a rotor mounted downstream of the stator. The stages are arranged successively along the longitudinal axis. The stator is formed by a fixed wheel with fixed vanes, known as a turbine stator, and the rotor is formed by a moving wheel with moving vanes. The moving wheel is rotatably mounted inside a turbine shroud centred on the longitudinal axis and which is secured to the casing. In particular, the moving wheel comprises a disc on which is mounted a plurality of moving vanes distributed circumferentially and regularly around the periphery of the disc.

The shroud is formed by a plurality of shroud sectors which are made of a ceramic matrix composite (CMC). The CMC materials have good mechanical properties, making them suitable for use as structural elements, and advantageously retain these properties at high temperatures. Indeed, the major constraint of turbomachines is their resistance to high temperatures. Thus, the shroud sectors of turbines made of CMC materials increase the capacity to withstand high temperatures, which improves the overall performance of the turbomachine. In addition, the CMC materials have a lower density than that of the refractory materials traditionally used.

Each CMC shroud sector comprises a base with a radially internal face and a radially external face which are opposite. The shroud sector comprises an upstream attaching tab and a downstream attaching tab extending from the radially external face. These upstream attaching tab and downstream attaching tab are intended to be fixed to a shroud support structure.

The use of CMC shroud sectors significantly reduces the ventilation required to cool the turbine shroud. However, the sealing between the gas flow duct on the inner side and outer side of the shroud sectors remains a problem. In order to improve the sealing between the shroud sectors, they comprise sealing means. The base comprises a first groove and a second groove which are formed in an inter-sector lateral face and which extend along the longitudinal axis. A first and a second longitudinal strips are respectively housed in the first and second grooves, the second strip being arranged radially outside the first strip. These strips are substantially the same size as the grooves so as to prevent leakage. However, the sealing is such that, in particular that achieved by the second strip, a significant pressure drop is likely to occur. The pressure may increase in the radially external part of the second strip and reach 10 to 15 bar, whereas the pressure in the radially internal part of the second strip may be lower. In addition, the primary flow can rise between the different shroud sectors, at the inter-sector lateral faces, which increases the temperature of the shroud sectors and in particular of the first and second strips which, being made of a metallic material, are more sensitive to high temperatures. The resistance of the shroud sectors to high temperatures is further limited by the presence of these metal strips.

3. PURPOSE OF THE INVENTION

One of the objectives of the present invention is to provide a simple and effective solution for limiting a rise in temperature of a shroud sector.

4. DISCLOSURE OF THE INVENTION

This objective is achieved in accordance with the invention by means of a turbine shroud sector made of ceramic matrix composite intended to extend about a longitudinal axis, the shroud sector comprising a base with a radially internal face, a radially external face from which there extend an upstream tab and a downstream tab for attachment to a shroud support structure, and at least an inter-sector lateral face intended to be mounted opposite a lateral face of a circumferentially adjacent shroud sector, the base further comprising a first groove and a second groove each formed in the inter-sector lateral face, extending along the longitudinal axis X and, a first and a second longitudinal sealing strips which each rest on a respective radially internal wall of these first and second grooves, the second groove being arranged radially outside the first groove, the first strip having an overall shape of an omega and the sector having a first clearance which is defined radially between a central part of the first strip and the radially internal wall of the first groove and a second clearance which is defined radially between the central part of the first strip and a radially external wall of the first groove, the radially internal and external walls being opposed along a radial axis Z perpendicular to the longitudinal axis X.

Thus, this solution enables to achieve the above-mentioned objective. In particular, such a configuration enables to improve the air circulation around the strips and in particular around at least part of the first strip so as to cool the shroud sector. The temperature of the first strip will be reduced as will the temperatures of the radially internal part of the lateral face intended to form an inter-sector interface of adjacent shroud sectors.

The shroud sector may comprise one or more of the following features, taken alone or in combination with each other:

- the radially internal wall of the first groove comprises an upstream step and a downstream step cooperating with the first strip, and the upstream and downstream steps being arranged respectively upstream and downstream of the central part of the first strip, the steps forming axial ends of a step which extends radially outwards from the radially internal wall of the first groove,
- the first strip of overall shape of an omega comprises the central part, and a first lateral branch and a second lateral branch which extend respectively upstream and downstream of the central part, the first and second lateral branches each being in contact with an axial end of the step formed by the steps,
- the first clearance and the second clearance are equal,
- the first groove comprises a central portion which is offset radially outwards from two end portions of the first groove,
- the first strip has a profile substantially complementary to that of the first groove, the first sealing strip comprising a central part extending equidistant from the radially internal and external walls of the peripheral wall of a central portion of the first groove, the radially internal and external walls being opposite along a radial axis perpendicular to the longitudinal axis, the central portion of the first groove extends between the upstream and downstream steps, the value of the first clearance and/or the second clearance is between 0.1 and 1 mm, the base comprises an upstream groove extending substantially along a radial axis Z and opening into a first side of the second groove, an upstream sealing strip being housed in the upstream groove, the base comprises a downstream groove extending substantially along the radial axis Z and opening into the first groove, a downstream sealing strip being housed in the downstream groove, the second groove comprises a second side which is arranged at a distance from the downstream groove, the distance along the longitudinal axis between the second side of the second groove and the downstream groove is between 0.1 and 5 mm, the second groove has a second side which opens into the downstream groove, the shroud sector comprises a first angled sealing element housed in both the upstream groove and the second groove and a second angled sealing element housed in both the first groove and the downstream groove, the shroud sector comprises a third angled sealing element housed in both the second groove and the downstream groove, the second strip is housed with a space between it and a peripheral wall of the second groove, the sealing strips are each made of a metallic material or an alloy of metallic material based on nickel, cobalt, or tungsten or a CMC material, each sealing strip has a thickness of between 0.1 and 1 mm, each angled sealing element has a thickness of between 0.1 and 1 mm.

The invention also relates to a turbine shroud assembly comprising a plurality of shroud sectors having any of the above features, arranged circumferentially so as to form a turbine shroud and a shroud support structure on which the shroud sectors are mounted.

The invention also relates to a turbomachine comprising a turbine shroud assembly as mentioned previously.

5. BRIEF DESCRIPTION OF THE FIGURES

The invention will be better understood, and other purposes, details, features and advantages thereof will become clearer on reading the following detailed explanatory description of embodiments of the invention given as purely illustrative and non-limiting examples, with reference to the appended schematic drawings in which.

6. DESCRIPTION OF EMBODIMENTS OF THE INVENTION

Figure 1:
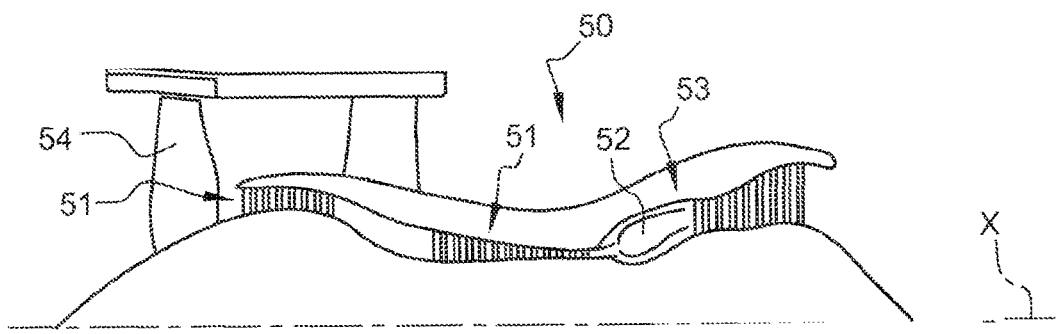
FIG. 1 is a schematic representation in axial and partial section of an example of a dual flow turbomachine to which the invention applies.

FIG. 1 shows an axial and partial cross-sectional view of a turbomachine of longitudinal axis X, in particular a dual flow turbomachine 50 to which the invention applies. Of course, the invention is not limited to this type of turbomachine.

This dual flow turbomachine 50 generally comprises, from upstream to downstream, a gas compressor assembly 51, a combustion chamber 52 and a turbine assembly 53. In the present invention, and in general, the terms "upstream" and "downstream" are defined with respect to the flow of gases in the turbomachine, and here along the longitudinal axis X. A fan 54 is arranged upstream of the compressor assembly so as to generate a primary flow and a secondary flow. The primary flow passes through the compressor assembly, the combustion chamber and the turbine assembly. The latter comprises in the present example a low pressure turbine and a high pressure turbine.

Figure 2:
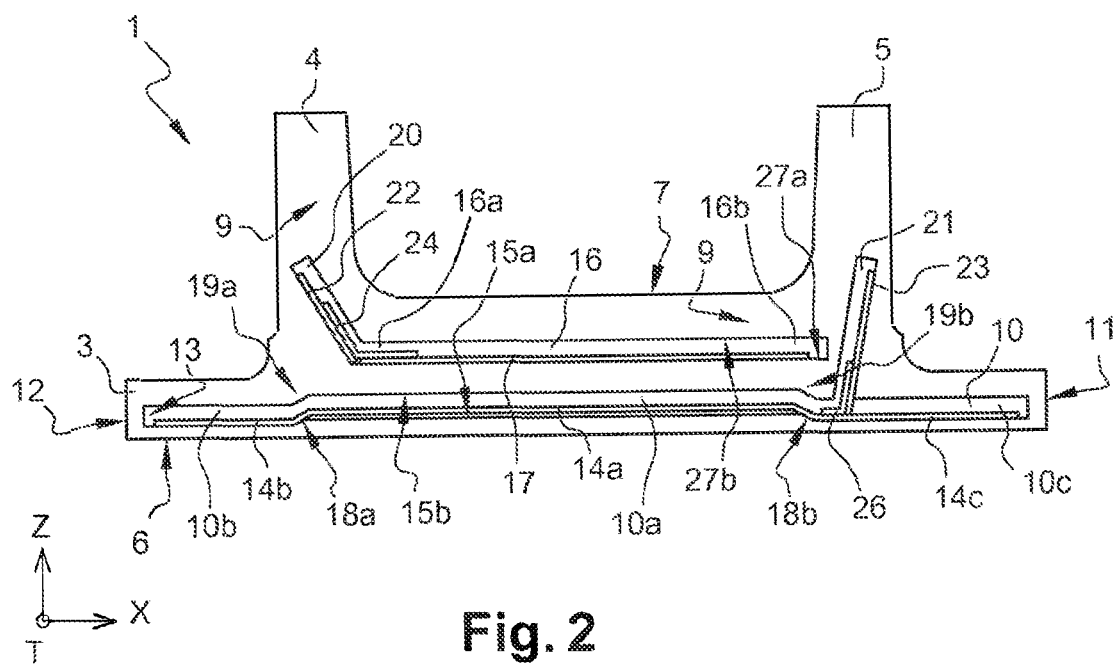
FIG. 2 is a partial view in perspective and in radial section of a turbine shroud comprising several shroud sectors comprising grooves and sealing strips housed in these grooves according to the invention.

With reference to FIG. 2, the turbine, and in particular the high-pressure turbine, comprises at least one turbine shroud 1 which extends around a longitudinal axis, the turbine shroud 1 being made of a ceramic matrix composite (CMC). The turbine shroud 1 surrounds a turbine wheel (not shown), which comprises a disc centred on the longitudinal axis and a plurality of moving vanes extending radially from the periphery of the disc. The free end of each moving vane is disposed opposite the turbine shroud 1.

In the present invention, the terms "radial", "radially", "inner", "outer", "internal" and "external" are defined with respect to a radial axis Z which is perpendicular to the longitudinal axis X.

According to other embodiments, the turbine shroud could form a radially internal or external platform of a turbine stator comprising fixed blades or vanes that extend radially between a radially internal platform and a radially external platform, the platforms being intended to define a gas flow channel in the turbomachine.

The turbine shroud 1 is formed by a plurality of shroud sectors 2. The shroud sectors 2 are each mounted circumferentially adjacent to each other about the longitudinal axis X. FIG. 2 is a radial cross-sectional view along a plane passing between two adjacent shroud sectors.

Each shroud sector 2 has a substantially inverted Pi (π) shaped radial cross-section. Each shroud sector comprises a base 3 and radial tabs 4, 5 which extend radially outwards from the base 3. The base 3 comprises a radially internal face 6 and a radially external face 7 opposite each other along the radial axis Z. The radially internal face 6 defines the inner face of the turbine shroud and delimits a flow duct (primary duct) of the primary flow circulating in the turbomachine. The radially internal face 6 may comprise a layer of abradable material and/or a thermal barrier for sealing cooperation with, for example, lips at the free ends of the moving vanes. The tabs are precisely an upstream tab 4 and a downstream tab 5 extending from the radially external face 7.

The upstream and downstream tabs 4, 5 are intended to be attached to a shroud support structure (not shown) which is secured with a turbine casing. The shroud support structure comprises, for example, an annular upstream radial flange and an annular downstream radial flange for this purpose. The upstream and downstream tabs 4, 5 each comprise holes 8 passing through their walls on either side along the longitudinal axis (see FIG. 3). The upstream and downstream radial flanges also each comprise a hole passing through their walls on either side along the longitudinal axis. Fastening means are engaged in both the upstream tab and the upstream flange and in both the downstream tab and the downstream flange to hold the shroud sector to the shroud support structure. The holes in the flanges and tabs are aligned when mounting the shroud sectors to the support structure. The fixing means may be pins or screws. The upstream and downstream tabs of each sector are mounted in a pre-stressed manner between the upstream and downstream flanges so that the flanges exert, at least in the "cold" state, i.e. at an ambient temperature of approximately 20° C., but also at all operating temperatures of the turbine, a stress on the tabs 4, 5 and thus a clamping of the shroud sectors by the flanges.

Each shroud sector further comprises sealing means arranged circumferentially between the shroud sectors and which are configured to prevent leakage of the primary flow outside the flow duct, here primary duct, into the turbine. In particular, each shroud sector comprises sealing strips to ensure their sealing. These sealing strips are housed in grooves in the shroud sector. More specifically, the base 3 comprises a first groove 10 extending substantially along the longitudinal axis. This first groove extends along almost the entire length of the base. The length of the base is determined between a first side 11 and a second side 12 opposite each other along the longitudinal axis X. The first and second sides 11, 12 respectively downstream and upstream connect the radially internal and outer faces 6, 7. The first groove 10 is formed in and opens into an inter-sector lateral face 9 of the shroud sector. The inter-sector lateral face 9 is intended to come into contact with another inter-sector lateral face of a circumferentially adjacent shroud sector. Each shroud sector comprises two lateral faces 9 which are opposed and each defined in a radial plane. The first groove 10 is disposed adjacent to the radially internal face 6.

A first sealing strip 14 is housed in the first groove 10. The first sealing strip 14 has a thickness which is less than the height of the first groove 10 (along the radial axis). The latter extends from an axial groove bottom 13 (see FIG. 3). This axial bottom 13 is arranged opposite the opening of the first groove, the opening leading into the lateral face 9. The height of the first groove 10 is measured between a radially internal wall 15a and a radially external wall 15b of the first groove 10. Advantageously, the height of the first groove 10 is constant along its entire length. In other words, when the first strip is housed in the first groove 10, a space or clearance is formed between the first strip 14 and the radially external wall 15b of the first groove 10.

The base 3 also comprises a second groove 16 extending along the longitudinal axis. The second groove 16 extends radially outside the first groove 10. The latter is located in the vicinity of the radially external face 7. As with the first groove 10, the second groove 16 is formed in the lateral face 9 into which it opens. The second groove 16 has a length (along the longitudinal axis) which is less than that of the first groove. A second sealing strip 17 is housed in the second groove 16. In other words, the second strip 17 is located radially outside the first strip 14. The second groove 16 is arranged radially outwards of the first strip 14. The second strip 17 also has a thickness which is less than the height of the second groove 16 (along the radial axis). The height of the second groove 16 is measured between a radially internal wall 27a and a radially external wall 27b of the second groove 16. A space or clearance is then formed between the second strip 17 and the radially external wall 27b of the second groove 16 when the second strip is received in the second groove 16.

In FIG. 2, at least the radially internal wall 15a of the first groove 10 comprises at least one step extending from the radially internal wall 15a of the first groove 10. In the present example, the radially internal wall 15a and the radially external wall 15b of the first groove 10 each comprise two steps which are an upstream step 19a and a downstream step 19b. These are opposite each other along the longitudinal axis and are each located axially at the level of an upstream or downstream tab of the shroud sector. The steps allow the creation of an elevation along the radial axis of the first strip 14 and help to hold the first strip in position. In particular, the steps 19a, 19b are formed by an inclination of a radially internal wall portion and a radially external wall portion 15a, 15b located opposite each other with respect to the radial axis Z. This implies that the first groove 10 comprises a central portion 10a which is offset radially outwards with respect to two axial end portions 10b, 10c of the first groove 10. The upstream and downstream steps 19a, 19b are disposed respectively upstream and downstream of the central portion 10a of the first groove 10. The two axial end portions 10b, 10c are located at the same radial distance with respect to the radially internal face 6. The end portion 10b extends upstream of the step 19a and the end portion 10c extends downstream of the step 19b. More specifically still, the steps of the radially internal wall 15a form axial ends of a step which extends from the radially internal wall 15a of the first groove 10. The axial ends each extend respectively upstream and downstream of the step of the radially internal wall 15a.

The height offset between each axial end portion 10b, 10c and the central portion 10a is between 0.3 and 1.5 times the height of the first groove 10 in the radial axis. The angle between the slope of the step and the longitudinal axis (for each upstream and downstream step 19a, 19b) is between 10° and 80°.

The first strip 14 has a profile corresponding to that of the first groove 10. In particular, the first strip 14 has an overall shape of an omega. The first strip 14 comprises an upstream step 18a and a downstream step 18b. The upstream and downstream steps 18a, 18b of the first strip form a central part 14a and first and second lateral branches 14b, 14c which are arranged on either side of the central part 14a. The upstream step 18a of the first strip 14 forms an internal inclined surface which is intended to bear against an inclined surface of the upstream step 19a of the radially internal wall 15a of the first groove 10. Similarly, the downstream step 18b forms an internal inclined surface which is intended to come to bear against an inclined surface of the downstream step 19b of the radially internal wall 15a of the first groove 10. As can be seen in FIG. 2, the upstream step 19a of the first groove 10 is upstream of the central part 14a and the downstream step 19b of the first groove 10 is downstream of the central part 14a. The first lateral branch 14b of the first strip 14 bears against the axial (upstream) end of the step and the second lateral branch 14c of the first strip 14 bears against the axial (downstream) end of the step. The first and second lateral branches extend in planes that are respectively parallel to the axial ends of the radially internal wall 15a.

In particular (see FIG. 4), a space or clearance may be formed radially on either side of the central part 14a of the first strip 14 between the first groove 10 and the first strip 14. More specifically still, a first clearance J1 is defined radially between the central part 14a of the first strip 14 and the radially internal wall 15a. A second clearance J2 is also defined radially between the central part 14a of the first strip 14 and the radially external wall 15b. The steps also allow the first and second clearances to be maintained despite the pressure forces tending to press the first strip against the radially internal wall 15a of the first groove in operation. Advantageously, but not limited to, the central part 14a of the first strip 14 extends substantially in the middle of the central portion of the first groove 10. In other words, the central part 14a extends at an equal distance from the inner and outer walls 15a, 15b of the central portion 10a of the first groove 10. The first clearance and the second clearance are equal. In this way, cooling "fresh" air can circulate around the first strip and in particular around the central part of the first strip 14.

Advantageously, but not limited to, the space or clearance between the first strip and a radially internal or external wall of the first groove has a value which is between 0.01 and 1 mm so as to obtain effective cooling. Indeed, as the clearance between the first strip and the wall of the first groove 10 is small, but not zero, the flow velocity around the first strip is increased and leakage is reduced.

The shroud sector 2 also comprises an upstream groove 20 and a downstream groove 21. The upstream groove 20 extends mainly along the radial axis and into the upstream tab 4. As for the downstream groove 21 extends mainly along the radial axis and into the downstream tab 5. A radially internal end of the upstream groove opens into a first side 16a of the second groove 16. With respect to the downstream groove 21, a radially internal end thereof opens into the first groove 10.

In this example of embodiment, the downstream groove 21 opens downstream of the downstream step 19b. As can also be seen in FIG. 2, the second side 16b of the second groove 16 is closed. In other words, the second side of the groove 16b does not open into the downstream groove 21. In this way, the first and second grooves do not communicate with each other. This arrangement improves the sealing of the shroud sector. Advantageously, the second side 16b of the second groove 16 is at a distance from the downstream groove 21. This configuration allows "fresh" air to preferentially flow into the first groove 10 and cool an area between the first strip 14 and the second strip 17 and in particular the first strip 14. This also reduces the pressure drop between the first and second strips, thereby reducing the risk of reintroduction of "very hot" air (from the primary flow) circulating in the primary duct.

Advantageously, but not limited to, the distance between the second side 16b and the downstream groove 21 along the longitudinal axis is between 0.1 and 5 mm. Such a distance enables to control the amount of air to be circulated between the grooves. Of course, the distance must not be too great so as not to degrade the specific consumption of the turbomachine (the less fresh air is "used", the better the consumption).

An upstream sealing strip 22 is housed in the upstream groove 20 and a downstream sealing strip 23 is housed in the downstream groove 21. The downstream sealing strip 23 is in contact with the first sealing strip 14 at one of its end. In this way, the strips 23 and 14 are radially superimposed, which reduces leakage.

The upstream strip 22 has a thickness which is less than the height of the upstream groove 20 in the radial axis. In this way a space or clearance is formed between the upstream strip and the upstream groove when the latter is installed in the upstream groove. Similarly, the downstream strip 23 has a thickness which is less than the height in the radial axis of the downstream groove 21 so as to form a space between them in the installation situation. Advantageously, the height of the upstream groove and the downstream groove in the radial axis are respectively constant along their entire length.

The thickness of each sealing strip 14, 17, 22, 23 is constant along their lengths. The strips have a thickness of between 0.1 mm and 1 mm.

As also illustrated in FIG. 2, angled sealing elements or gaskets are provided to come into contact with strips to further reduce leakage. In particular, a first angled sealing element 24 is housed in both the upstream groove 20 and the second groove 16. This first angled sealing element 24 is therefore at the junction of the grooves 20 and 16. Advantageously, the first sealing element 24 is in contact with the upstream strip 22 and the second strip 17. The first sealing element 24 overlaps the strips 22, 17.

A second angled sealing element 26 is arranged in both the first groove 10 and the downstream groove 21. This second sealing element 25 is therefore at the junction of grooves 10 and 21. Advantageously, the second sealing element 26 is in contact with the first strip 14 and the downstream strip 23. The second sealing element 26 overlaps the strips 14, 23.

The strips 14, 17, 22, 23 are made of a metallic material, for example. They may also be made of a metallic alloy based on nickel, cobalt or tungsten. Alternatively, the strips are made of a CMC material.

The strips 14, 17, 22, 23 are made, for example, by additive manufacturing or by MIM (Metal Injection Molding) manufacturing. These manufacturing methods enable to quickly and directly form very small sealing strips.

The sealing elements 24, 26 are also made of a metallic material, or a metallic alloy or a CMC material. These can be made by methods similar to the strips, i.e., by additive manufacturing or MIM. These also have a thickness of between 0.1 and 1 mm.

With two horizontal sealing strips 14, 17, superimposed along the radial axis Z, a double seal is achieved at the base 3 of the shroud, which reinforces the inter-sector seal (between the lateral faces 9 of two adjacent shroud sectors) in the shroud while ensuring a redirection of the air flowing from the external side of the shroud towards the upstream side, i.e. in the wheel formed by the moving vanes inside the shroud. In addition, the use of the angled sealing elements 24, 26 allow to plug the leaks that may occur at the contact portions between the sealing strips, i.e., at the junctions of the grooves.

Figure 3:
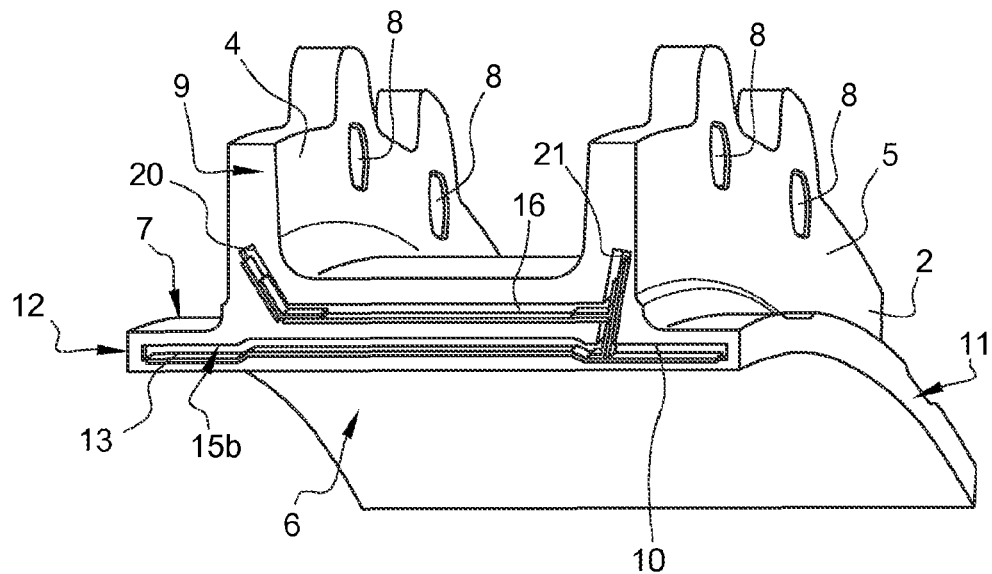
FIG. 3 is a partial radial cross-section perspective view of another embodiment of a shroud sector with sealing strips in grooves according to the invention.
Figure 4:
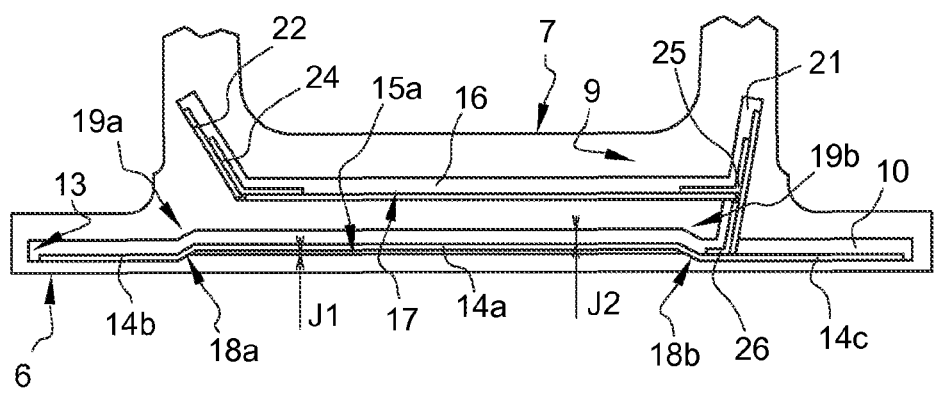
FIG. 4 is a front view of an example of a shroud sector with a base in which grooves are formed each housing a sealing strip according to the invention.

FIGS. 3 and 4 illustrate another embodiment of a shroud sector. The elements described above are referred to in the remainder of the description by the same numerical references. The shroud sector of this example differs from the previous embodiment in that the second side 16b of the second groove opens into the downstream groove 21. In other words, the grooves 10, 16, 20 and 21 communicate with each other. A third sealing element 25 is placed in both the second groove 16 and the downstream grove 21. This third angled sealing element 25 is thus at the junction of the grooves 16 and 21. Advantageously, the third sealing element 25 is in contact with the second strip 17 and the downstream strip 23. As with the sealing elements 24 and 25, the sealing element 26 is partially inserted into the grooves 16 and 21.

The invention claimed is:

1. A turbine shroud sector made of ceramic matrix composite intended to extend about a longitudinal axis X, the shroud sector comprising a base with a radially internal face, a radially external face from which there extends an upstream tab and a downstream tab for attachment to a shroud support structure, and at least one inter-sector lateral face intended to be mounted opposite a lateral face of a circumferentially adjacent shroud sector, the base further comprising a first groove and a second groove each formed in the inter-sector lateral face, extending along the longitudinal axis X and, a first and a second longitudinal sealing strip which each rest on a respective radially internal wall of the first and second grooves, the second groove being arranged radially outside the first groove, wherein the first strip has an overall shape of an omega and the first strip has a central part which is housed in the first groove and thus located radially between the radially internal wall and a radially external wall of the first groove and the shroud sector has a first clearance which is defined radially between the central part of the first strip and the radially internal wall of the first groove and a second clearance which is defined radially between the central part of the first strip and the radially external wall of the first groove, the radially internal and external walls being opposite along a radial axis Z perpendicular to the longitudinal axis X.

2. The shroud sector according to claim 1, wherein the radially internal wall of the first groove comprises an upstream step and a downstream step cooperating with the first strip and the upstream and downstream steps being respectively arranged upstream and downstream of the central part of the first strip, the upstream and downstream steps forming axial ends of a step which extends radially outwards from the radially internal wall of the first groove.

3. The shroud sector according to claim 2, wherein the first strip of overall shape of an omega comprises the central part, and a first lateral branch and a second lateral branch which extend respectively upstream and downstream of the central part, the first and second lateral branches each being in contact with an axial end of the step formed by the steps.

4. The shroud sector according to claim 1, wherein the first clearance and the second clearance are equal.

5. The shroud sector according to claim 1, wherein the value of the first clearance and the second clearance is between 0.1 and 1 mm.

6. The shroud sector according to claim 1, wherein the base comprises:

an upstream groove extending substantially along the radial axis Z and opening into a first side of the second groove, an upstream sealing strip being housed in the upstream groove, and a downstream groove extending substantially along the radial axis Z and opening into the first groove, a downstream sealing strip being housed in the downstream groove.

7. The shroud sector according to claim 6, wherein the second groove comprises a second side which is arranged at a distance from the downstream groove.

8. The shroud sector according to claim 7, wherein a distance along the longitudinal axis between the second side of the second groove and the downstream groove is between 0.1 and 5 mm.

9. The shroud sector according to claim 6, wherein the second groove has a second side which opens into the downstream groove.

10. The shroud sector according to claim 6, wherein it comprises a first angled sealing element housed in both the upstream groove and the second groove and a second angled sealing element housed in both the first groove and the downstream groove.

11. The shroud sector according to claim 8, wherein it comprises a third angled sealing element housed in both the second groove and the downstream groove.

12. A turbine shroud assembly comprising a plurality of shroud sectors according to claim 1 arranged circumferentially so as to form a turbine shroud and the shroud support structure on which the shroud sectors are mounted.

13. The shroud sector according to claim 1, wherein the value of the first clearance or the second clearance is between 0.1 and 1 mm.

14. The shroud sector according to claim 1, wherein the first strip is made in one piece.

15. The shroud sector according to claim 1, wherein the first strip comprises an upstream step and a downstream step which form the central part, the upstream step forms an internal inclined surface which is intended to bear against an inclined surface of the upstream step of the radially internal wall of the first groove and the downstream step forms an internal inclined surface which is intended to come to bear against an inclined surface of the downstream step of the radially internal wall of the first groove.

* * * * *